No. 731,447. PATENTED JUNE 23, 1903.
G. H. GALE.
PROCESS OF CONSTRUCTING STORAGE BATTERY PLATES.
APPLICATION FILED MAY 16, 1902.
NO MODEL.

WITNESSES.
O. B. Barnziger.
J. M. Poland.

INVENTOR.
George H. Gale
By Newell S. Wright,
his Attorney

No. 731,447.

Patented June 23, 1903.

UNITED STATES PATENT OFFICE.

GEORGE H. GALE, OF DETROIT, MICHIGAN.

PROCESS OF CONSTRUCTING STORAGE-BATTERY PLATES.

SPECIFICATION forming part of Letters Patent No. 731,447, dated June 23, 1903.

Application filed May 16, 1902. Serial No. 107,648. (No model.)

*To all whom it may concern:*

Be it known that I, GEORGE H. GALE, a citizen of the United States, residing at Detroit, county of Wayne, State of Michigan, have invented a certain new and useful Improvement in Storage Batteries, of which the following is a specification, reference being had to the accompanying drawings, which form a part of this specification.

My invention relates to storage batteries, and more particularly pertains to the construction of the plates of a battery for the storage of electricity, the plates being adapted to hold the active material in a superior manner and to a larger extent than has been heretofore common.

Figure 1:
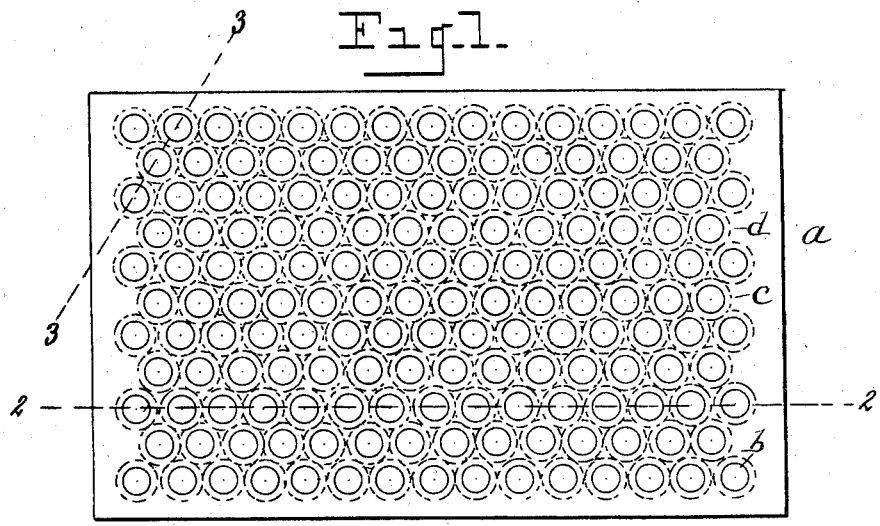
Figure 2:
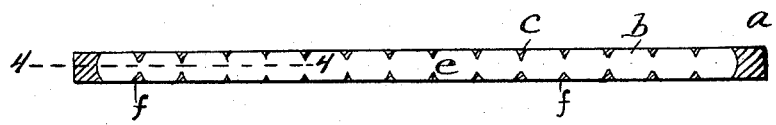
Figure 3:
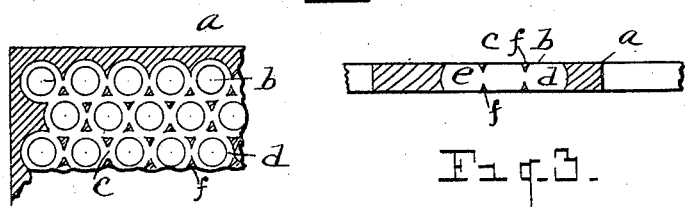
Figures 4, 5:
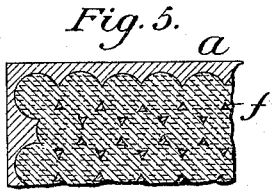
Figure 6:
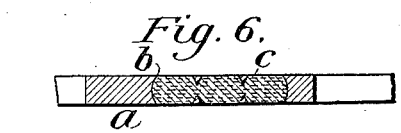

In the drawings submitted herewith, Figure 1 is a plan view of a plate embodying my invention. Fig. 2 is a view in section on the line 2 2, Fig. 1. Fig. 3 is a view in section on the line 3 3, Fig. 1. Fig. 4 is a view in section on the line 4 4, Fig. 2. Fig. 5 is a view similar to Fig. 4, but showing the active material in place. Fig. 6 is a view in vertical section similar to Fig. 3, but showing the active material in place.

Among the objects of my invention are, first, to make a plate for this purpose of superior strength; second, to provide a plate to contain a larger quantity of active material therein than has heretofore been common; third, to have the active material filled into the interior chamber of the plate in a united or solid mass, the mass projecting through the holes and filling them flush with the opposite surfaces of the plate; fourth, to form a plate from a sheet of metallic lead, holes being formed in the plate, intervening webs between the holes of the surfaces of the plate being left intact, the walls of the holes being reamed out or undercut between the two surfaces, forming an interior chamber, the webs on the two surfaces of the plate being united by integrally-connecting separated ribs, the intact webs and interior ribs with the united margins forming a strong plate, the active material being afterward filled into said interior chamber and the holes flush with the surfaces of the plate.

In carrying out my object a battery may be supplied with any desired number of plates $a$, which plates may be made of metallic lead, said plates being provided with a series of holes $b$, extending through the plate. These holes upon the two surfaces of the plate are separated one from another by intervening webs $c$. The walls of said holes are reamed out or cut away between the two surfaces of the plate, as indicated at $d$, the reaming out or cutting away of the walls about the holes being of such a nature or degree as to cause the various holes to communicate between the surfaces of the plate, as shown at $e$. The holes as thus reamed out and the interior chamber thus formed hold the active material. The holes being located close together and their walls being thus reamed out between the two opposite surfaces of the plate enable the plate to hold such an amount of active material as will very greatly increase the efficiency of the plates and of the storage battery formed thereby. The holes are preferably arranged in rows in such a manner that the holes in one row will alternate with those in the adjacent row or, in other words, so that the holes in the plate will be staggered.

The holes are made round or annular, the walls between the surfaces of the plate being so undercut or reamed out as to leave interior separated strengthening-ribs $f$, integrally connecting the webs on the two surfaces of the plate.

It will be apparent that a plate so constructed not only will hold a superior amount of active material, but in such a manner also that the active material will not be liable to drop out or become displaced.

What I claim as my invention is—

The herein-described process of constructing a storage-battery plate consisting of forming a series of holes through a sheet of metallic lead, reaming out or cutting away the walls of said holes between the two surfaces of the plate causing said holes to communicate between the surfaces of the plate and forming an interior chamber, and filling said chamber and holes with a solid mass of active material.

In testimony whereof I have signed this specification in the presence of two subscribing witnesses.

GEORGE H. GALE.

Witnesses:
N. S. WRIGHT,
J. M. POLAND.